US007814551B2

(12) United States Patent
Darweesh et al.

(10) Patent No.: US 7,814,551 B2
(45) Date of Patent: Oct. 12, 2010

(54) SYSTEM AND METHOD FOR MANIFEST GENERATION

(75) Inventors: Michael Darweesh, Redmond, WA (US); Tony Ureche, Redmond, WA (US); Michael David Marr, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1296 days.

(21) Appl. No.: 10/658,149

(22) Filed: Sep. 9, 2003

(65) Prior Publication Data

US 2005/0055315 A1 Mar. 10, 2005

(51) Int. Cl.
*G06F 7/04* (2006.01)
*G06F 17/30* (2006.01)
*H04N 7/16* (2006.01)

(52) U.S. Cl. .................... 726/26; 726/27; 713/150; 713/162

(58) Field of Classification Search .................. 726/26, 726/27
See application file for complete search history.

(56) References Cited

U.S. PATENT DOCUMENTS

| 5,673,316 A * | 9/1997 | Auerbach et al. ............. 705/51 |
| 5,758,069 A * | 5/1998 | Olsen ........................... 726/27 |
| 5,937,411 A | 8/1999 | Becker ........................ 707/103 |
| 6,279,111 B1 * | 8/2001 | Jensenworth et al. ......... 726/10 |
| 6,289,512 B1 | 9/2001 | Edwards et al. ............... 717/11 |
| 6,330,670 B1 * | 12/2001 | England et al. ................ 713/2 |
| 6,342,907 B1 | 1/2002 | Petty et al. ................... 345/762 |
| 6,381,742 B2 | 4/2002 | Forbes et al. .................. 717/11 |
| 6,519,617 B1 | 2/2003 | Wanderski et al. .......... 707/513 |
| 6,704,868 B1 * | 3/2004 | Challener et al. ........... 713/168 |
| 2002/0108041 A1 * | 8/2002 | Watanabe et al. ........... 713/175 |
| 2003/0220880 A1 * | 11/2003 | Lao et al. ...................... 705/51 |
| 2005/0044197 A1 * | 2/2005 | Lai ............................ 709/223 |

OTHER PUBLICATIONS

McAllister, N., "Freedom of Expression, Emerging Standards in Rights Management", *New.Architect, Internet Strategies for Technology Leaders*, Mar. 2002, http://www.newarchitectmag.com/print, 5 pages.
Reviewing XrML2.0, "How Well is ContentGuard Responding to Challenges to its Rights Description Language?", *The Soybold Report*, Dec. 17, 2001, 26-27.

* cited by examiner

*Primary Examiner*—Kimyen Vu
*Assistant Examiner*—Yogesh Paliwal
(74) *Attorney, Agent, or Firm*—Woodcock Washburn LLP (57) ABSTRACT

The execution of software may be controlled by a security policy expressed in a manifest. The software vendor or distributor specifies requirements for the use of software (e.g., which modules may be loaded into the software's address space, which module-signing keys are trustworthy, etc.), using a manifest specification language. A generation tool reads the specification and creates a manifest based on the specification. The tool may handle such details as retrieving keys from key files, computing software hashes, and the like. The manifest is distributed with the software and used by the environment in which the software executes to enforce the security policy.

29 Claims, 6 Drawing Sheets

SYSTEM AND METHOD FOR MANIFEST GENERATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the field of computing, and, more particularly, to a mechanism for generating a manifest for software.

BACKGROUND OF THE INVENTION

One objective in the field of computer security is to prevent tampering with a program while it executes. One way to tamper with a program is to load, into the program's address space, code or data that causes the program to behave in an unexpected way. Thus, certain types of tampering can be prevented by controlling what can be loaded into a program's address space, and requiring the program to run in an environment that has certain security features. One way to exert such control over the execution of a program is to associate the program with a "manifest," which is a document or other data structure that describes the restrictions and security features of an environment in which a software object is permitted to execute. The execution environment can then enforce the manifest as the program executes.

One example situation in which a manifest is useful is in the case of Digital Rights Management (DRM) applications, which control access to valuable information (e.g., copyrighted audio, video, text, etc.). A DRM system generally uses cryptography to protect content, and is able to decrypt the content for approved uses. Allowing rogue code modules into the address space of the DRM system software would allow those rogue modules to access decrypted content in that address space, and to make unauthorized distribution or use of the content. Thus, a software vendor whose software needs to work with a DRM system provides a manifest with the software that describes the rules governing what may or may not be loaded into the software's address space, which provides some assurance that the vendor's software will behave as expected and can safely be given access to the information that the DRM system protects. (DRM is one example of a situation where computer security is important, although there are numerous other examples as well.)

It is theoretically possible to create a manifest by hand, although it is impractical to do so. The manifest creation process may include various cryptographic operations, such as digital signing, certificate chaining, computation of hashes, etc. Moreover, the manifest that is ultimately produced is an (often lengthy) XRML (eXtensible Rights Markup Language) file, which is an unwieldy format for a programmer to work with by hand. Thus, it is desirable to have a mechanism that automate portions of the manifest generation process, without involving a programmer in the details of performing cryptographic operations, or requiring the programmer to create an XRML file by hand.

In view of the foregoing, there is a need for a mechanism that overcomes the drawbacks of the prior art.

SUMMARY OF THE INVENTION

The present invention provides a mechanism that generates a manifest for a piece of software. The manifest specifies certain security requirements that are to be observed while the software executes—e.g., that certain modules may, or may not, be loaded into the software's address space. The manifest may specify the rules governing which modules are acceptable and which ones are not in various ways, such as:

The manifest may contain the names of acceptable (or unacceptable) modules;

The manifest may specify that modules signed by certain keys are acceptable (or unacceptable);

The manifest may specify that modules that hash to a certain value under a known hash function are acceptable (or unacceptable);

The manifest may specify certain ranges of version numbers that are acceptable (or unacceptable).

A software distributor or vendor may create a description that specifies the requirements that are to be embodied in the manifest. A language may be designed to simplify manifest description, and the invention provides one such example language called Manifest Configuration Format ("MCF"). The requirements may then be provided to a tool that reads the description and creates the manifest based on the description. For example, if the manifest description lists certain signing keys that are to be trusted (or distrusted), the tool may retrieve the key files containing these keys, and incorporate the keys into the manifest, thereby saving the distributor from the tedious task of including long cryptographic keys in the manifest by hand. The tool may perform various other mechanical functions (e.g., retrieving certificate chains, computing hashes of known modules, etc.) based on the manifest description. The tool then produces a manifest in a usable format (e.g., eXtensible Rights Markup Language, or "XRML").

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

One type of attack on a secure computing environment is to load a rouge module into the address space of an executing program. Thus, a measure of computer security can be achieved by limiting what can be loaded into a program's address space. A manifest can be used to specify what may be loaded into a process's address space. However, creation of the manifest is often a tedious, mechanical process that is not practical to perform manually. The present invention provides a mechanism for creating a manifest that automates certain portions of the manifest generation process.

Example Computing Environment

Figure 1:
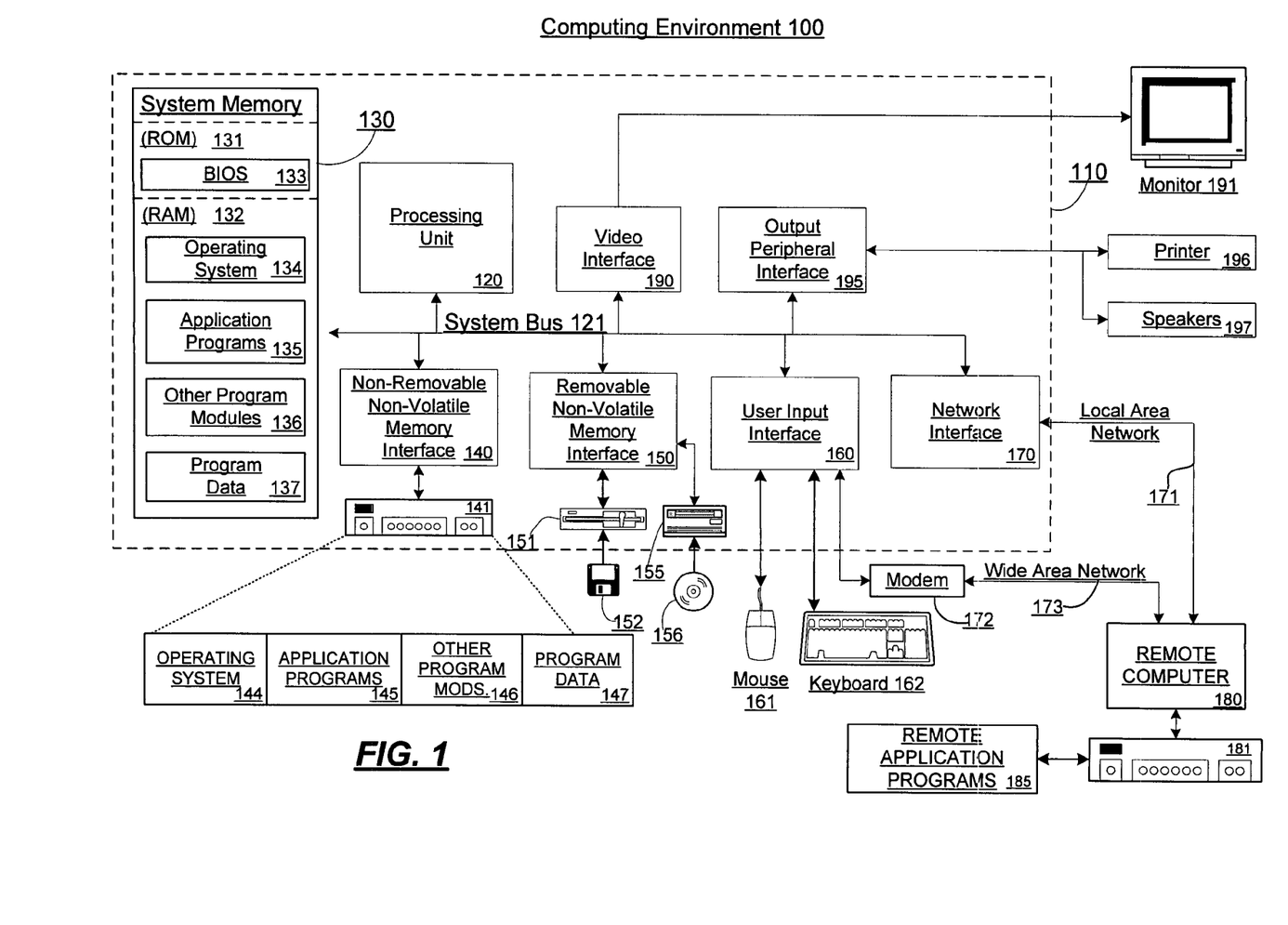
FIG. 1 is a block diagram of an example computing environment in which aspects of the invention may be implemented.

FIG. 1 shows an example computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are merely examples, and other means of establishing a communications link between the computers may be used.

Software Protection Based on a Manifest

Figure 2:
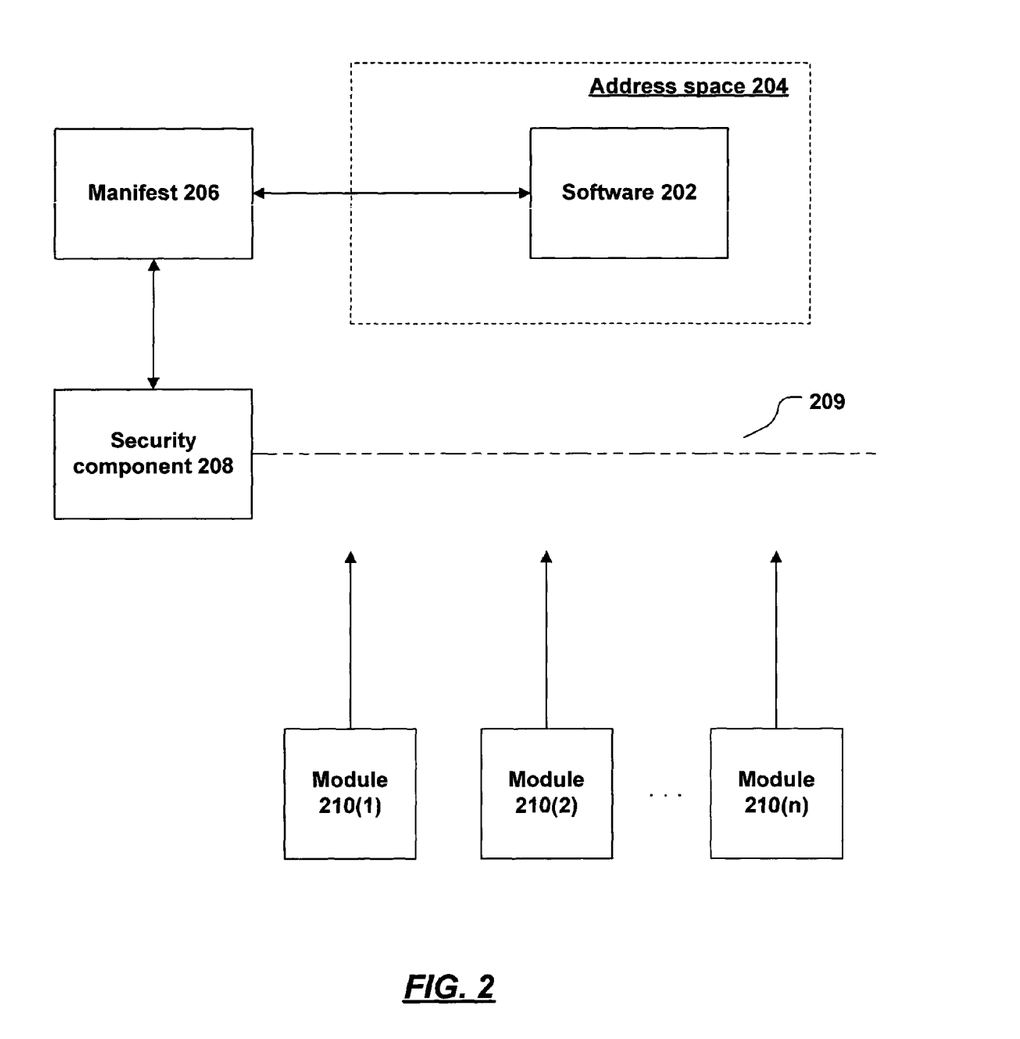
FIG. 2 is a block diagram of an environment in which a software object is associated with a manifest.

The present invention provides a mechanism for generating a manifest for software. A manifest is a data structure that is associated with a piece of software and describes various restrictions on the manner in which the software may be used. The restrictions, in general, are aimed at enforcing a security policy with respect to the software. FIG. 2 and the following discussion describe a manifest, and the role of a manifest in providing security.

Software 202 is a piece of executable code (e.g., an application program, etc.) that may execute on a computer, such as computer 110 (shown in FIG. 1). When software 202 executes, an address space 204 is provided to software 202. Address space 204 is a region of memory that is available for use by software 202 while software 202 is executing. Address space 204 is provided by the operating system, or other runtime environment, under which software 202 executes. For example, on an INTEL x86 processor running one of the MICROSOFT WINDOWS operating systems, address space 204 typically contains the code for software 202 itself, as well as any data used by software 202, and any auxiliary code modules (e.g., dynamic-link libraries (DLLs)) that software 202 uses while it executes.

It will be appreciated that one feature of address space 204 is that any code module loaded into address space 204 will have access to any code or data that is in address space 204. If an untrustworthy code module is loaded into address space 204, that code module could modify software 202, or data used by software 202, and thereby cause software 202 to behave in an unintended or unexpected manner. This unintended behavior could be used for nefarious purposes—e.g., if software 202 manages secret cryptographic keys that are used to protect valuable information, a rogue code module loaded into address space 204 could modify software 202 in such a manner that the keys would be divulged. Thus, some measure of security can be provided by limiting what code modules can be loaded into the address space 204 used by software 202.

Thus, software 202 may be associated with a manifest 206 that effectively defines or limits which code modules may be loaded into the address space 204 of software 202. Manifest 206 is enforced by security component 208. Security component 208 may comprise hardware and/or software that prevents code modules from being loaded into software 202's address space 204, except as permitted by the policy specified in manifest 206.

Security component 208 imposes a permeable barrier 209 that allows some modules to be loaded into address space 204, while preventing other modules from being loaded into that address space. For example, modules 210(1), 210(2), . . . , 210(n) are modules that can potentially be loaded into software 202's address space 204. Whenever an attempt is made to load a module into the address space 204 assigned to an instance of software 202, security component 208 checks the manifest 206 associated with software 202. If loading of a particular module is permitted by the policy specified in manifest 206, then the loading of the module is allowed to proceed. Otherwise, the loading of the module is not permitted.

The policy specified by manifest 206 may take various forms. In the simplest case, manifest 206 may identify the names of those modules that may (or may not) be loaded. However, the policy may take other forms. For example, manifest 206 may specify the hashes of acceptable modules (e.g., that a module is acceptable if the Secure Hash Algorithm (SHA) applied to the module generates a hash of "0123456"), or may specify that a module is acceptable if it is digitally signed by a particular certifying authority, or that modules having certain version numbers are acceptable (or unacceptable).

Thus, in one embodiment, a manifest is essentially a set of rules that describes what may, or may not, be loaded into a software object's address space.

Architecture for Manifest Generation

A manifest is generally embodied as a file that describes, in some format, the rules for what may or may not be loaded into a software object's address space. Once the format has been decided upon, it is possible for a programmer to generate the manifest by hand. However, there are various reasons for which it may be undesirable or inefficient to generate a manifest by hand. In particular, the manifest may involve cryptographic keys, digital signatures, and hashes that are tedious—and, in many cases, impractical—to generate by hand. Moreover, the expression of the rules embodied by the manifest may be lengthy. Thus, it is desirable to provide a mechanism that automates generation of the manifest based on a specification.

Figure 3:
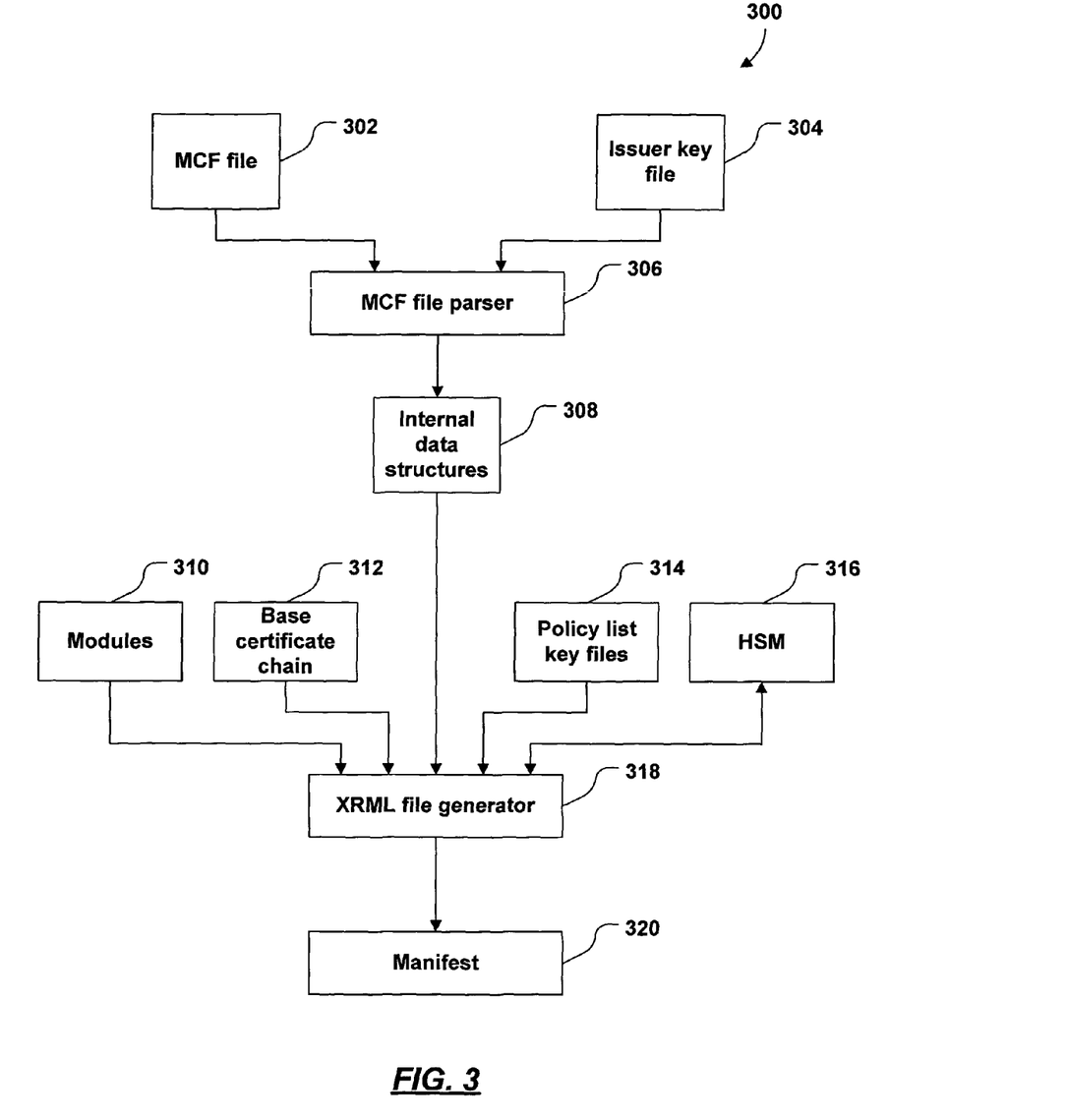
FIG. 3 is a block diagram of an architecture for a system that generates a manifest.

FIG. 3 shows an architecture for a system 300 that can be used to automate generation of a manifest. System 300 allows a manifest to be generated based on a high-level description of the rules that the manifest needs to embody. In one embodiment, the description comes in the form of a Manifest Configuration File (or "MCF") 302. MCF is an example language for specifying a manifest; however, it should be understood that a variety of languages can be devices for specifying the content of a manifest. (As discussed below in connection with FIG. 5, the system of FIG. 3 can be configured to work with various different manifest-specification languages.)

MCF file 302 contains a description that includes:
 a list of modules that can be loaded into a given software object's address space;
 a list of trusted keys that can be used to sign modules that may be loaded into a software object's address space (or untrusted keys that cannot be used to sign such modules);
 a list of trusted and/or untrusted software hashes;
 a list of untrusted software module name/version combinations.

MCF file parser 306 receives MCF file 302, and also receives a file 304 that contains the private key of the issuer of the manifest. The private key contained in key file 304 is the key that will ultimately be used to sign the manifest. As is known in the art, asymmetric cryptographic algorithms may be used to digitally sign an arbitrary data blob with the private portion of a public/private key pair, such that the public portion may later be used to verify the authenticity of the data blob. When the signed data blob is verified, the verifier can be certain that the data blob has not been modified since it was signed by the holder of the private key—at least to the extent that one can be certain that no one other than the signer possesses the private key, and to the extent that the private key is long enough that it cannot feasibly be computationally deduced from the public key. Thus, the use of key file 304—and the private key contained therein—allows the manifest that will be created by system 300 to be signed so that its integrity and authenticity can later be verified.

MCF file parser 306 parses MCF file 306, and produces a generic representation of the substance that the file specifies. This generic representation is shown in FIG. 3 as internal data structures 308. Internal data structures 308 are analogous to the parse trees produced by the front end of a programming language compiler. Thus, MCF file is a human-readable/writable syntax for specifying manifest requirements, and internal data structures 308 represent the substance of those requirements, albeit stripped of the human-readable syntax.

Once internal data structures 308 have been generated, they are provided to XRML file generator 318. XRML stands for "eXtensible Rights Markup Language." XRML is a dialect of XML (eXtensible Markup Language) that is used for specifying rights to data. XRML file generator 318 generates manifest 320 based on the substantive requirements embodied in internal data structures 308. (As described above, the substantive requirements embodied in internal data structures 308 are derived from MCF file 302.)

Some of the substantive requirements embodied in internal data structure 308 may specify information to be obtained from other source. Elements 310-316 are other sources that may be called for. For example, the manifest may specify certain modules 310 that can be loaded into the address space of the software object to which the manifest relates. XRML file generator 318 may access the specified modules 310 in order to compute hashes of those modules. The hashes can then be included in manifest 320 so that the integrity of a module can be verified at the time that the module is loaded into the address space.

Additionally, the manifest is preferably signed by certifying authorities whose trustworthiness is derived through intermediate entities leading back to a root trusted entity; the certificate chain 312 that is necessary to verify the signature back to the root of trust may be retrieved by XRML generator 318, so that the certificate chain can be included in manifest 320. An example of a certificate chain is discussed below in connection with FIG. 4.

A manifest may also specify public key certificates that are to be keys that are to be trusted or distrusted. Modules may have digital signatures that may be verified at the time the module is loaded. When a module is to be loaded and the module is signed by a distrusted key, that signature will not be relied upon to establish the trustworthiness, authenticity, or integrity of the signed module.

Hardware security module (HSM) 316 is a component of hardware that has a built-in key pair, and that includes logic to apply the private key to a data blob without divulging the private key. In one example, the private key that will sign manifest 320 is not provided in the form of key file 304, and instead system 300 is referred to HSM 316, which contains this private key and generates the signature of manifest 320. In such a case, XRML file generator 318 communicates with HSM in order to create a digital signature for manifest 320.

Certificate Chain 312

Figure 4:
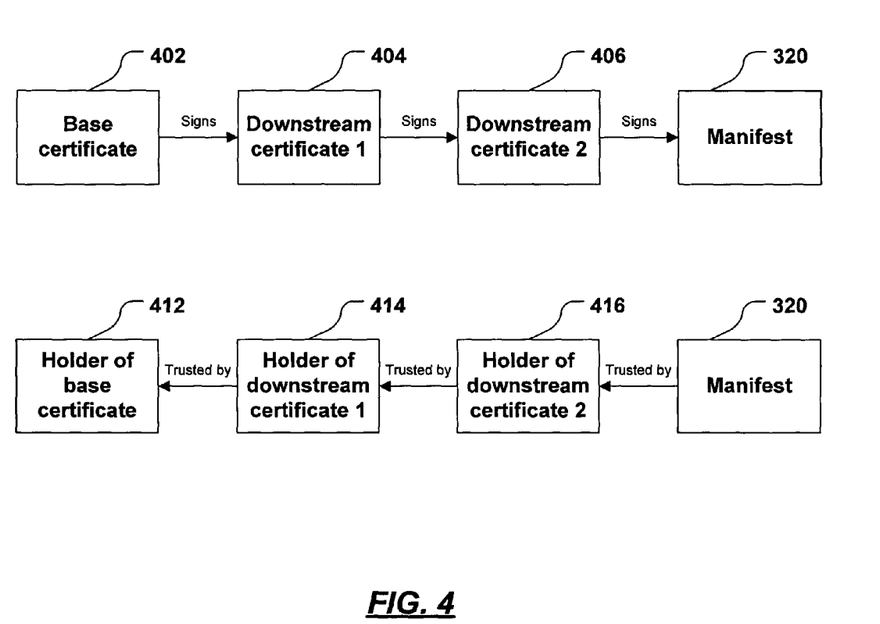
FIG. 4 is a block diagram of a certificate chain and a trust model based thereon.

As described above, manifest 320 is signed, and a certificate chain 320 may be included in the manifest that allows the manifest to be verified. FIG. 4 shows an example of a certificate chain.

Trust is established through a chain that leads back to a "root of trust." Essentially, each participant in the chain vouches for the trustworthiness of another participant. The chain leads back to the "root," whose trustworthiness is generally known and accepted. The assertion that a first party trusts a second party is made by the first party using its private key to sign the public key certificate of the second party. Thus, in the example of FIG. 4, there is a base certificate 402, which includes a public/private key pair. The holder of the base certificate uses its private key to sign intermediate certificate 404. The private key of intermediate certificate 404 may be used to sign intermediate certificate 406. The private key of intermediate certificate 406 may then be used to sign manifest 320.

Typically, manifest 320 is signed by the vendor or distributor of the software to which manifest 320 relates. Thus, the software issuer is the holder 416 of certificate 406, and the signature of manifest 320 constitutes holder 416's assertion that manifest 320 is the legitimate manifest for that software. However, this assertion is only good to the extent that certificate holder 416 can be trusted to make that assertion. Since certificate 406 is signed by the private key of certificate 404, this fact means that the holder 416 of certificate 406 is trusted by holder 414 of certificate 404. Moreover, certificate 404 has been signed by the holder 412 of the base certificate 402. As noted above, the holder of base certificate 402 is an entity whose trustworthiness has been established and is generally accepted. The correctness of the manifest is established because that correctness has been asserted by entity 416, who is trusted by entity 414, who is trusted by entity 412, who is trusted by the community at large.

Establishing that the chain of trust exists is established by walking backward through the certificate chain and using the public keys to verify the signatures—i.e., the public key of certificate 406 is used to verify the signature of manifest 320; the public key of certificate 404 is used to verify the signature on certificate 406, and so on. Thus, in order to verify the correctness of manifest 320 back to the root of trust, all of the public keys in the chain must be included in the manifest (or otherwise available at the time the signature on the manifest is verified). Including a set of public key certificates is an example of a task that would be tedious or impractical to perform by hand. Thus, as discussed above in connection with FIG. 3, the manifest generating system obtains the public key certificates that will be needed to verify the signature on the manifest, and includes those public key certificates in the manifest.

Interchangeability of Input and Output Formats

Figure 5:
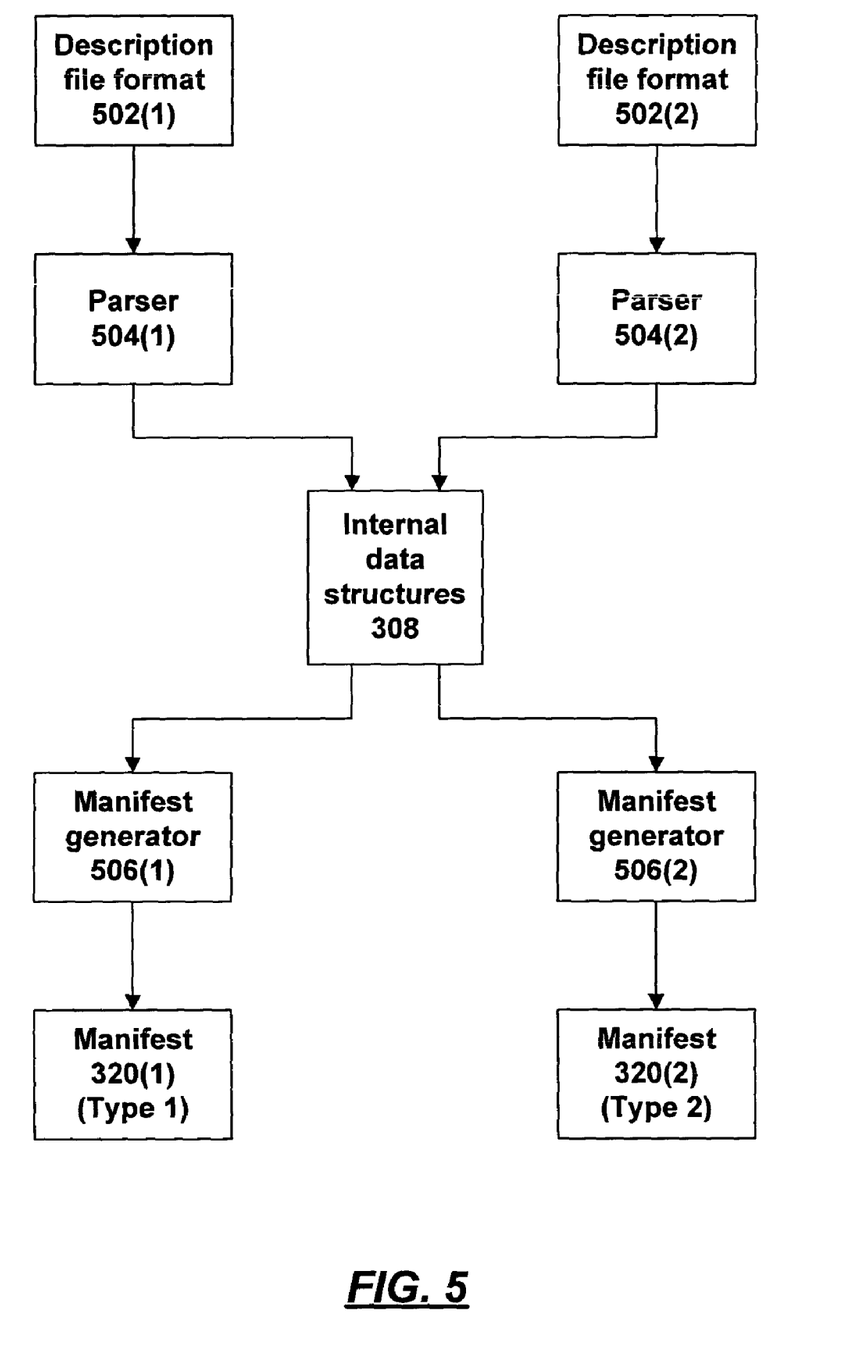
FIG. 5 is a block diagram of a system that uses replaceable input and output filters.

As described above in connection with FIG. 3, an MCF file parser generates intermediate data structures 308, and these intermediate data structures are then used to generate an manifest in XRML format. One advantage of using intermediate data structures 308 to represent the substantive description of a manifest is that the format for both the input and output of the manifest generator can be changed relatively easily. Thus, manifests could be described in some format other than MCF, and manifests could be generated in some format other than XRML. FIG. 5 shows how different input parsers and output generators can be substituted in a manifest generation system.

FIG. 5 shows two parsers: parser 504(1), which parses input files of format 1, and parser 504(2), which parses input files of format 2. Thus, manifest description file 502(1) is in format 1 (e.g., MCF), and is read by parser 504(1), while manifest description file 502(2) is in format 2 (e.g., some format other than MCF), and is read by parser 504(2). Both parsers are configured to produce intermediate data structures 308. Thus, after either file 502(1) or 502(2) has been processed by its corresponding parser, the substance of the description contained in either file will have a common representation in the form of internal data structures 308.

These internal data structures may then be read by either manifest generator 506(1), or manifest generator 506(2). For example, manifest generator 506(1) may be a generator that produces a manifest 320(1) in XMRL format, and manifest generator 506(2) may be a generator that produces a manifest 320(2) in some other format. By using different "front ends" (e.g., parsers 504(1) and 504(2)), and different back ends (e.g., manifest generators 506(1) and 506(2)), it is possible to combine different input formats with different output formats.

Process of Creating a Manifest

Figure 6:
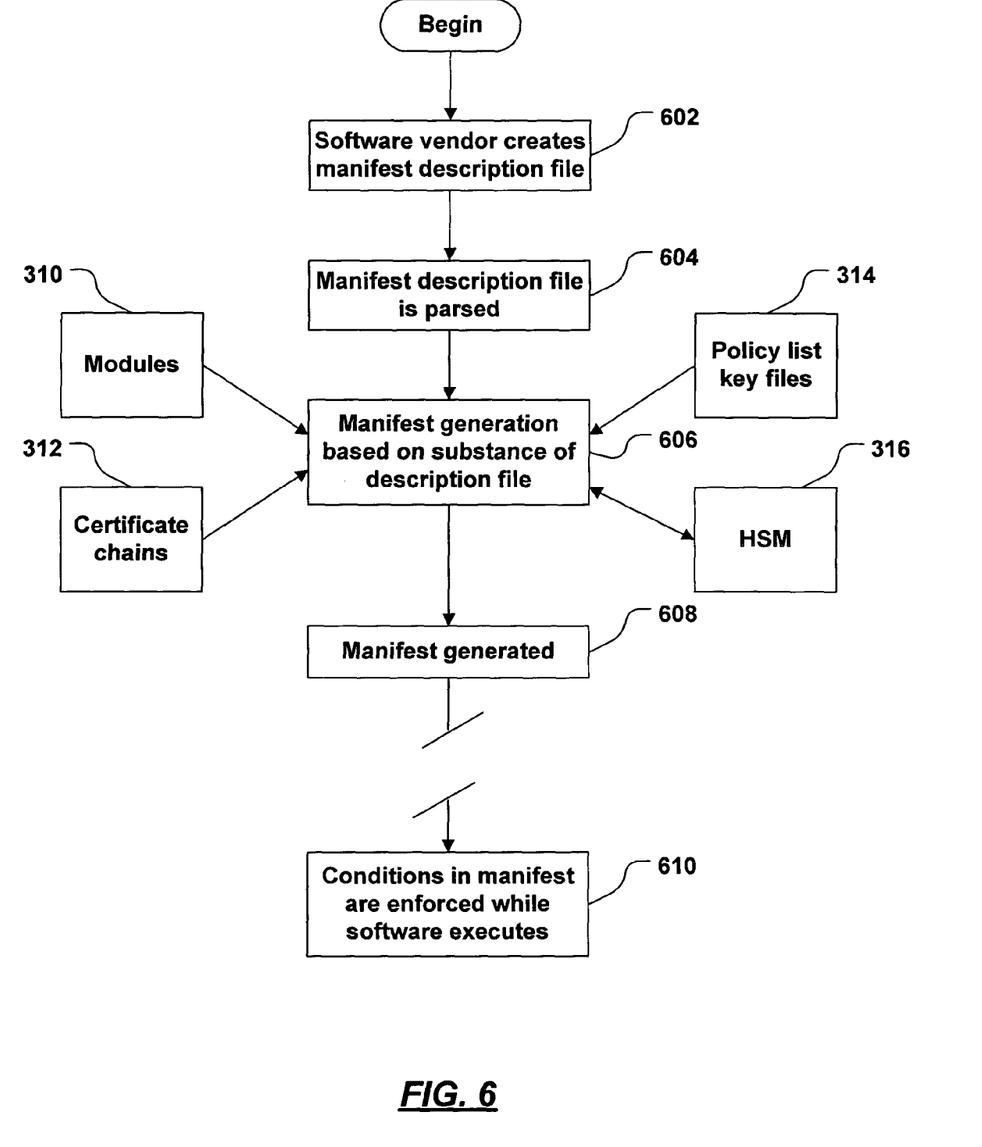
FIG. 6 is a flow diagram of a process for creating a manifest.

FIG. 6 shows an example process for creating a manifest in accordance with the invention. Initially, the software vendor or distributor creates a manifest description (602), such as an MCF file as discussed above. The manifest description file is then provided to the manifest generation system, and is parsed (604). As discussed above, the parsing of the manifest description may include creating internal data structures that represent the substance of the manifest in a manner that is not dependent on any particular input format (e.g., MCF). As discussed above, in connection with FIG. 3, the act of generating a manifest may include accessing modules 310, certificate chains 312, and key files 314 specified in policy lists, and may also include communication with a hardware security module 316 to perform signing of the manifest.

The result of the above-described process is that a manifest is generated (608) for a piece of software. The generated manifest is then distributed with the software to which it corresponds, and the requirements specified in the manifest may be enforced as the software executes (610).

Example Manifest

The following is an example of a manifest 320 that may be generated by system 300. The example manifest is in XRML format. It should be noted that XRML is capable of expressing rights and requirements in a variety of ways, and one feature of system 300 is that it may lead to uniformity in the way that manifests are written by generating manifests that adhere to a fixed format. The example manifest shown below includes a header, a module list, and a policy list. The header describes the issuer of the manifest, and contains the issuer's certificate. The module list includes a list of modules that are either required to be loaded, or that may be loaded. For each module in the list, the list contains the name of the file that contains the module, and, optionally, a hash of the module. The policy list includes any of the following: keys that may be used to sign modules, keys that may not be used to sign modules, hashes of modules that may not be loaded, and versions (or version ranges) of modules that may not be loaded.

The following is an example manifest:

```
<?xml version="1.0" ?>
<XrML xml:space="preserve" version="1.2">
  <BODY type="LICENSE" version="3.0">
    <ISSUEDTIME>2003-07-08T18:59</ISSUEDTIME>
    <DESCRIPTOR>
      <OBJECT type="Manifest">
        <ID type="MS-GUID">{b469880c-839c-4fcc-9b08-0c036cd8ce2f}</ID>
      </OBJECT>
    </DESCRIPTOR>
    <ISSUER>
      <OBJECT type="Corporation">
        <ID type="MS-GUID">{11111111-1111-1111-1111-111111111111}</ID>
        <NAME>Microsoft Corporation</NAME>
        <ADDRESS type="URL">http://www.microsoft.com</ADDRESS>
      </OBJECT>
      <PUBLICKEY>
        <ALGORITHM>RSA</ALGORITHM>
        <PARAMETER name="public-exponent">
          <VALUE encoding="integer32">65537</VALUE>
        </PARAMETER>
```

-continued

The following is an example manifest:

```
      <PARAMETER name="modulus">
        <VALUE encoding="base64"
size="1024">a2StTOfzEBuPHeyxZeCoMpFdmxz/PEh06nzv3+IO+deqFZc1nqNTiWtkpra981qUSr
vdXmLyLnzj1JEsMySPRqRBsE5jh7jViN0L7/oNBNoAbZN1mMt1emIq2GgT/KDjfYqGYtTKek1
JUEYfjX+uAnrRUeS9WwkVWTXaJ4zxZNI=</VALUE>
      </PARAMETER>
    </PUBLICKEY>
  </ISSUER>
  <!-- Created by Genmanifest v2.5 Copyright 2002–2003 Microsoft Corporation. -->
  <MODULELIST>
   <MODULE type="required">
    <OBJECT>
     <ID type="filename">genManifest.exe</ID>
    </OBJECT>
   </MODULE>
   <MODULE type="required">
    <OBJECT>
     <ID type="filename">geneAPI.dll</ID>
    </OBJECT>
    <DIGEST>
     <ALGORITHM>SHA1</ALGORITHM>
     <VALUE encoding="base64"
size="160">HhPXzrKJff5hMWlOF5lhaYUwYlg=</VALUE>
    </DIGEST>
   </MODULE>
   <MODULE type="required">
    <OBJECT>
     <ID type="filename">kernel32.dll</ID>
    </OBJECT>
    <DIGEST>
     <ALGORITHM>SHA1</ALGORITHM>
     <VALUE encoding="base64"
size="160">T514fr2h/pCGk6E+S7tF2uRM3GI=</VALUE>
    </DIGEST>
   </MODULE>
   <MODULE type="optional">
    <OBJECT>
    <ID type="filename">msvcrt.dll</ID>
    </OBJECT>
    <DIGEST>
     <ALGORITHM>SHA1</ALGORITHM>
     <VALUE encoding="base64"
size="160">qRTLjCcwerD40aA+ibsBmcdix0w=</VALUE>
    </DIGEST>
   </MODULE>
  </MODULELIST>
  <POLICYLIST type="inclusion">
   <POLICY>
    <PUBLICKEY>
     <ALGORITHM>RSA</ALGORITHM>
     <PARAMETER name="public-exponent">
      <VALUE encoding="integer32">65537</VALUE>
     </PARAMETER>
     <PARAMETER name="modulus">
      <VALUE encoding="base64"
size="2048">e5t5LrxyzXuICb9lSKeb8CNeEHK+yf+HC0PhMGfoNOO2+bJmQDCpYwhkuFx1V
ubnqElHLWWYYdsKBgVXCupjfSKTjAM9vY0FLHtDBRUbv6FXJU1Qjmp+eqlDWi1UD171ISx
KadtJhh1XtBi4LkYF69zXppTRoX5MSsLIpH/JckiXaT7RC8H2No+h1uVtxQOvb2HhBzKFusdshr
B8bQgSpy0dUHEawD+QH7PYzAfYeOXzJFZZ0hwDzVXRS91FU2DCpm8syQnR08XanTxL2R
ZMPSsmuC+Aycq05NWDKTyl2iWyOsN/bzqGjaYC4/B0+iy4bjwdKliivifWbZG4/47oI3w==</VA
LUE>
     </PARAMETER>
    </PUBLICKEY>
   </POLICY>
   <POLICY>
    <PUBLICKEY>
     <ALGORITHM>RSA</ALGORITHM>
     <PARAMETER name="public-exponent">
      <VALUE encoding="integer32">65537</VALUE>
     </PARAMETER>
     <PARAMETER name="modulus">
      <VALUE encoding="base64"
size="2048">34UTdyCzyYUGszAiowjwvMo8XHIap9Z/zbD+lYCuvvbaBHeBFl47tu9XVoHSpgg
KZqT7W/9WPAcSS7s3aWCQVwAhKAmWzBivTnRteqf9rk6UVOw6v4CJs0VVv9MbxgKU76f3
h1I3HZ9lBVhgFGOYPeYYK5HnqZ8UJAgxHFCaO2S0melMdy1goXyCrGFVbJq7D4TjQoNJ7Kg
5KKksljg+CudGwSZYtQy/LDrQmSZomppmLb/EluiSAQ/ePB3WI2J6a8WzZoSfjxyGnOvy2lTJdq
zueWRC0WsyYI+im6JRfD4gop3+t6NMlf74XyWNqaLqMF54l58oG07yO+Zwwb0CqQ==</VAL
```

-continued

The following is an example manifest:

```
UE>
      </PARAMETER>
    </PUBLICKEY>
   </POLICY>
   <POLICY>
    <PUBLICKEY>
     <ALGORITHM>RSA</ALGORITHM>
     <PARAMETER name="public-exponent">
       <VALUE encoding="integer32">65537</VALUE>
     </PARAMETER>
     <PARAMETER name="modulus">
       <VALUE encoding="base64"
size="512">AZjPMjpA8PgPfTv/2ej2/Bq8AkExlvfMYHRqo9q/F2b/nwNIlnbi+NctDGCjl55O+JoL
07pnHaQSmx4v/s5FwA==</VALUE>
     </PARAMETER>
    </PUBLICKEY>
   </POLICY>
  </POLICYLIST>
  <POLICYLIST type="exclusion">
   <POLICY>
    <DIGEST>
     <ALGORITHM>SHA1</ALGORITHM>
     <VALUE encoding="base64"
size="160">RLlrMivZUOld7avlYUiWKhetkxU=</VALUE>
    </DIGEST>
   </POLICY>
   <POLICY>
    <PUBLICKEY>
     <ALGORITHM>RSA</ALGORITHM>
     <PARAMETER name="public-exponent">
       <VALUE encoding="integer32">65537</VALUE>
     </PARAMETER>
     <PARAMETER name="modulus">
       <VALUE encoding="base64"
size="512">vweHosx7SCi1mzhXHNUCeYwacDPNBvPHQL2fcV9BFoz41Djr/OumKxs7wTce43
QZdJiAp6EiP3gU+SQjfsUJwg==</VALUE>
     </PARAMETER>
    '</PUBLICKEY>
   </POLICY>
   <POLICY>
    <OBJECT>
      <ID type="filename">gene.exe</ID>
      <VERSIONSPAN min="5.1.3500.0" max="5.1.3572.0" />
    </OBJECT>
   </POLICY>
  </POLICYLIST>
 </BODY>
 <SIGNATURE>
   <ALGORITHM>RSA PKCS#1-V1.5</ALGORITHM>
   <DIGEST>
     <ALGORITHM>SHA1</ALGORITHM>
   </DIGEST>
   <VALUE encoding="base64"
size="1024">dZqwtY7nEtBP3ZCyVZ4i/BFX2EjlFaNF0ginQE7GYAEyPVaodGkPjeVcqUpLtDv
VVg1f4MWzcKqp4yLKMGprZ8VdwqHnEdQsJIjQjPF8duOQ7NXFxcQsSFDgZ76m1AoP1116Sa
otGPO1svbhl77GSYe016ta2pkAYCEw2O+W4+M=</VALUE>
 </SIGNATURE>
</XrML>
```

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of automating generation of a vendor-provided manifest that governs execution of a software object distributed by the vendor, the method comprising:

creating, via a computer, a manifest configuration file (MCF) that provides a description of requirements to be embodied in the vendor-provided manifest, the description including an identity of a key file that contains a cryptographic key, wherein providing said identity of the key file eliminates the need to manually insert cryptographic key data into the vendor-provided manifest;

parsing the MCF to create a generic representation containing substance specified in the MCF; and providing the generic representation to a manifest generation tool that reads the generic representation, retrieves said cryptographic key to obtain cryptographic key data for insertion into the vendor-provided manifest, and generates the vendor-provided manifest in an eXtensible Rights Markup Language (XRML) format based on the requirements, said manifest comprising one or more rules imposed by the vendor to enable a security component to impose a permeable barrier for ensuring integrity of an address space that is used in a computer for executing the software object, the one or more rules incorporating a list of acceptable and unacceptable modules, wherein the acceptable modules are permitted to pass through the permeable barrier and are executed in the address space of the computer and the unacceptable modules are prevented from passing through the permeable barrier and unconditionally barred from being executed in the address space of the computer.

2. The method of claim 1, wherein said MCF identifies the acceptable and unacceptable modules, and wherein generating the manifest comprises including, in said manifest, the identities of the acceptable and unacceptable modules identified in said MCF.

3. The method of claim 2, wherein said MCF indicates whether said manifest will contain hashes for identifying the unacceptable modules.

4. The method of claim 1, wherein at least one of said acceptable modules comprises a key, and wherein said MCF indicates that the at least one of said acceptable modules signed with said key may be loaded into said address space, and wherein generating said manifest comprises:

retrieving said key by using a filename provided in said MCF; and including said key in said manifest.

5. The method of claim 1, wherein generating said manifest comprises:

computing a hash of at least one of said unacceptable modules; and including said hash in said manifest.

6. The method of claim 1, further comprising:

receiving a key associated with at least one of a) a vendor or b) a distributor of said software object;

signing said manifest with said key to produce a digital signature; and including said digital signature in said manifest.

7. The method of claim 1, further comprising:

using a hardware security module to sign said manifest, said hardware security module being adapted to apply a key associated with at least one of a) a vendor or b) a distributor of said software object without revealing said key outside said hardware security module.

8. The method of claim 1, wherein at least one of the unacceptable modules is identified in the list by a version number.

9. The method of claim 1, wherein at least one of the unacceptable modules is identified in the list by a range of version numbers.

10. The method of claim 1, wherein integrity of said address space is further enforced by confining inside said address space each of a) said software object, b) data used by said software object, and c) auxiliary code modules that are used by said software object.

11. The method of claim 1, wherein said MCF is an MCF file containing a high-level description using human-readable syntax and wherein parsing the MCF to create a generic representation comprises removing at least a portion of the human-readable syntax.

12. The method of claim 11, wherein removing at least a portion of the human-readable syntax comprises removing all human-readable syntax from the MCF.

13. The method of claim 1, further comprising:

obtaining information pertaining to a set of public key certificates that are needed to verify correctness of the vendor-provided manifest back to a root of trust;

incorporating the obtained information into the MCF; and using the MCF to include the set of public key certificates into the vendor-provided manifest, thereby eliminating the need to manually insert data corresponding to each individual public key certificate contained in the set of public key certificates.

14. A computer-readable storage medium encoded with computer-executable instructions to perform a method of generating a manifest that governs the execution of a software object distributed by a vendor, the method comprising:

generating a manifest configuration file (MCF) containing a high-level description of the manifest using human-readable syntax, wherein the high-level description comprises a vendor-specified policy configured to preclude loading of a rogue module into an address space of a computer in which the software object is to be executed;

parsing the MCF by eliminating at least a portion of the human-readable syntax to generate a generic representation of the material contained in the MCF;

generating a manifest based on the generic representation, the generation comprising:

including in said manifest an identification of an executable module and an indication that either:

said executable module may be loaded into said address space; or said executable module may not be loaded into said address space; and providing the generic representation to a manifest generation tool that reads the generic representation and generates the manifest in an eXtensible Rights Markup Language (XRML) format.

15. The computer-readable storage medium of claim 14, wherein said rogue module is located external to the manifest and is operative to perform an unauthorized operation in said address space of said computer.

16. The computer-readable storage medium of claim 14, wherein the policy comprises an identity of an unacceptable module that is unconditionally barred from being executed in the address space of the software object.

17. The computer-readable storage medium of claim 16, wherein the unacceptable module is identified in the policy by a hash identifier.

18. A method of automating the generation of a manifest that governs the execution of a software object, the method comprising:

creating, via a computer, a manifest configuration file (MCF) using a high-level description containing human-readable syntax that simplifies the describing of the manifest and permits a vendor to specify what may be loaded into an address space of a computer in which the software object is to be executed, the specification referring to one or more components that are external to the software and external to the specification;

parsing the MCF to generate an internal data structure representing a substance of the requirements with at least a portion of the human-readable syntax removed;

using a manifest generation tool that accepts the internal data structure and automatically generates therefrom, the manifest, wherein the manifest generation tool does at least one of a) including, in said manifest, data from one of said one or more components; or b) computing a value based on one of said one or more components and including the computed value in said manifest, thereby eliminating the need for the vendor to manually insert the computed value into the manifest; and providing the substance of the requirements to a manifest generation tool that reads the substance of the requirements and generates the substance of the requirements in an eXtensible Rights Markup Language (XRML) format.

19. The method of claim 18, wherein said one or more components comprises a module, wherein said MCF indicates either that said module may be loaded into a secure address space or that said module may not be loaded into said address space, and wherein said manifest generation tool does at least one of:

including an identifier of said module in said manifest; or computing a hash of said module and including the hash in said manifest.

20. The method of claim 18, wherein said one or more components comprise a key, wherein said MCF file indicates either that modules signed with said key may be loaded into a secure address space or that modules signed with said key may not be loaded into said address space, and wherein said manifest generation tool retrieves said key from a location identified in said MCF, and includes a certificate for said key in said manifest.

21. The method of claim 18, wherein the method further comprises:

receiving a key associated with at least one of a) a vendor or b) a distributor of the software;

signing said manifest with said key to produce a digital signature; and including said digital signature in said manifest.

22. The method of claim 18, further comprising:

using a hardware security module to sign said manifest, said hardware security module being adapted to apply a key associated with at least one of a) a vendor or b) a distributor of the software without revealing said key outside said hardware security module.

23. A system comprising a processor for generating a manifest, the system further comprising:

a first parser implemented on the processor, the first parser configured to receive a manifest configuration file (MCF) specification in a human-readable syntax indicative of requirements for a manifest, the first parser generating therefrom, a generic representation of said requirements by removing at least a portion of the human-readable syntax, said requirements relating to what may be loaded into an address space of a software object, said MCF specification referring to one or more components external to said software and external to said MCF specification;

a first manifest generator that generates a manifest based on said representation and includes in said manifest information computed based on, said one or more components, the manifest configured to interoperate with a security component that imposes a permeable barrier for selectively allowing acceptable modules to be loaded into the software space of the software object and blocking unacceptable modules from being loaded into the software space thereby preventing unauthorized tampering of the one or more components; and providing the generic representation to a manifest generation tool that reads the generic representation and generates the manifest in an eXtensible Rights Markup Language (XRML) format.

24. The system of claim 23, wherein said one or more components comprise a module, and wherein said first manifest generator generates said manifest by including, in said manifest, a datum that identifies said module.

25. The system of claim 24, wherein said datum comprises a hash of said module.

26. The system of claim 23, wherein said one or more components comprise a key, wherein said specification indicates either that acceptable modules signed with said key may be loaded into said address space or that unacceptable modules signed with said key may not be loaded into said address space, and wherein said first manifest generator retrieves said key from a file identified in said MCF specification and includes said key in said manifest.

27. The system of claim 23, wherein said first manifest generator generates a digital signature for said manifest by signing said manifest with a key associated with a vendor or distributor of said software object, and includes said digital signature in said manifest.

28. The system of claim 23, further comprising:

a second parser that receives a manifest specification indicative of requirements for a manifest, the second parser generating a representation of said requirements in the same format as said first parser, wherein said first parser parses specifications in a first format and said second parser parses specifications in a second format different from said first format, and wherein first manifest generator generates said manifest based on a representation produced either by said first parser or said second parser.

29. The system of claim 23, further comprising:

a second manifest generator that generates a manifest based on said representation, wherein said first manifest generator generates a manifest in a first format and said second manifest generator generates a manifest in a second format different from said first format.

* * * * *

UNITED STATES PATENT AND TRADEMARK OFFICE
CERTIFICATE OF CORRECTION

| | | |
|---|---|---|
| PATENT NO. | : 7,814,551 B2 | Page 1 of 1 |
| APPLICATION NO. | : 10/658149 | |
| DATED | : October 12, 2010 | |
| INVENTOR(S) | : Michael Darweesh et al. | |

It is certified that error appears in the above-identified patent and that said Letters Patent is hereby corrected as shown below:

In column 17, line 28, in Claim 20, after "MCF" delete "file".

Signed and Sealed this

Seventeenth Day of May, 2011

David J. Kappos
*Director of the United States Patent and Trademark Office*